United States Patent [19]

Ostoja-Starzewski et al.

[11] Patent Number: 5,686,542
[45] Date of Patent: Nov. 11, 1997

[54] PROCESS FOR THE PREPARATION OF BRANCHED LOW-PRESSURE POLYETHYLENE, NEW LOW-PRESSURE POLYETHYLENES, AND PREFORMED BIFUNCTIONAL CATALYSTS

[75] Inventors: Karl-Heinz Aleksander Ostoja-Starzewski, Bad Vilbel; Josef Witte, Cologne; Herbert Bartl, Odenthal; Karl-Heinz Reichert; Georgios Vasiliou, both of Berlin, all of Germany

[73] Assignee: Bayer Aktiengesellschaft, Leverkusen

[21] Appl. No.: 708,679

[22] Filed: Sep. 5, 1996

Related U.S. Application Data

[62] Division of Ser. No. 607,651, Feb. 27, 1996, Pat. No. 5,616,529, which is a continuation of Ser. No. 357,157, Dec. 15, 1994, abandoned, which is a continuation of Ser. No. 162,788, Dec. 6, 1993, abandoned, which is a division of Ser. No. 852,916, Mar. 13, 1992, abandoned, which is a continuation of Ser. No. 332,292, Mar. 31, 1989, abandoned, which is a continuation of Ser. No. 63,026, Jun. 17, 1987, abandoned.

[30] Foreign Application Priority Data

Jun. 28, 1986 [DE] Germany .......................... 36 21 763.3

[51] Int. Cl.$^6$ ................ C08F 4/24; C08F 4/26; C08F 210/02
[52] U.S. Cl. .................................... 526/75; 526/96
[58] Field of Search .................... 526/75, 348.3, 526/96

[56] References Cited

U.S. PATENT DOCUMENTS

| | | | |
|---|---|---|---|
| 3,151,181 | 9/1964 | Hewitt et al. | 526/348.3 |
| 3,645,992 | 2/1972 | Elston | 526/348.6 |
| 3,984,610 | 10/1976 | Elston | 526/169.2 |
| 4,205,021 | 5/1980 | Morita et al. | 526/348.3 |
| 4,690,991 | 9/1987 | Seppola | 526/348.3 |
| 5,122,581 | 6/1992 | Fries | 526/348.3 |

FOREIGN PATENT DOCUMENTS

| | | | |
|---|---|---|---|
| 594127 | 2/1978 | U.S.S.R. | 526/101 |
| 858945 | 1/1961 | United Kingdom | 526/101 |

*Primary Examiner*—Edward J. Smith
*Attorney, Agent, or Firm*—Connolly and Hutz

[57] ABSTRACT

Branched low-pressure polyethylenes are prepared by oligomerization of ethylene on a nickel-containing catalyst and polymerization of the oligomers obtained, if appropriate in the presence of ethylene, on a chromium-containing catalyst.

1 Claim, No Drawings

PROCESS FOR THE PREPARATION OF BRANCHED LOW-PRESSURE POLYETHYLENE, NEW LOW-PRESSURE POLYETHYLENES, AND PREFORMED BIFUNCTIONAL CATALYSTS

This is a divisional of Ser. No. 08/607,651, filed Feb. 27, 1996, now U.S. Pat. No. 5,616,529 which is a continuation of Ser. No. 08/357,157 filed Dec. 15, 1994, now abandoned, which is a continuation of 08/162,788 filed Dec. 6, 1993, now abandoned which is a divisional of 07/852,916 filed Mar. 13, 1992, now abandoned which is a continuation of 07/332,292 filed Mar. 31, 1989 now abandoned which is a continuation of 07/063,026 filed Jun. 17, 1987 now abandoned.

The invention relates to a process for the preparation of branched low-pressure polyethylenes, new low-pressure polyethylenes, and new preformed bifunctional catalysts.

Polyethylenes are usually divided into 3 groups.

HDPE is taken to mean linear polyethylene having a density of 0.96 to 0.97 g/cm$^3$. Linear ethylene polymers having lower density are prepared by copolymerization of ethylene with α-olefines, such as, for example, 1-butene or 1-octene, and are designated LLDPE. Low-density polymers, having long-chain branches, which are usually prepared by homopolymerization of ethylene using free radical-forming catalysts under very high pressure (>1,000 bar) and at high temperatures are designated LDPE.

The "Ziegler-Natta process" and the high-pressure process, for example, are known processes for the preparation of polyethylenes. Low-pressure polyethylenes HDPE and LLDPE are prepared using transition-metal catalysts, if appropriate using mixtures thereof. A process has become known, from German Patent Specification 2,660,510, in which copolymers of ethylene and $C_3$- to $C_6$-1-olefines, having reduced density and a melt flow index of up to 2.0, are prepared by polymerization of ethylene with at least one $C_3$- to $C_6$-1-olefine under relatively low pressure and using chromium- and titanium-containing supported catalysts which have been activated in air or oxygen at a temperature of 300° to 900° C., contain 0.05 to 3.0% by weight of chromium and 1.5 to 9.0% by weight of titanium, relative to the total weight of the supported catalyst, and in which chromium and titanium are present, after the activation, in the form of oxides, ethylene being copolymerized with an amount of 1-olefine which is sufficient in order to produce the desired density in the copolymer and a content of $C_{3-6}$-comonomers of 1.0 to 15 mol-%, in a fluidized bed process at a $G_{mf}$ value of 1.5 to 10, a temperature of 30° to 105° C. and a pressure of less than 68.7 bar with the aid of a catalyst which contains up to 2.5% by weight of fluorine.

The disadvantage of the known processes for the preparation of branched low-pressure polyethylenes is that, besides ethylene, at least one other monomer must be used which is more expensive than ethylene. In addition, the length of the side chain is limited in the known processes, The invention has the object of providing a simple, inexpensive process for the preparation of a linear low-pressure polyethylene having side chains which are preferably longer-chain.

A process has now been found for the preparation of low-pressure polyethylenes having side chains, which process is characterized in that 1. ethylene is oligomerized on an Ni-containing catalyst, and
2. these oligomers are polymerized on a Cr-containing catalyst, if appropriate in the presence of ethylene.

The oligomerization and polymerization may be carried out in separate reactors, but may alternatively be carried out successively in the same reactor. In a preferred embodiment, the Ni-containing catalyst and the Cr-containing catalyst are present simultaneously, at least for a time, in the reaction space. The oligomerization is preferably carried out to a molecular weight of about 1,000.

It is also possible to use a preformed catalyst which is obtained by reaction of nickel and chromium components in the absence of ethylene.

The invention furthermore relates to a branched low-pressure polyethylene which is characterized in that the main chain of the polyethylene has side chains of different lengths, particularly having 14° to 200° C. atoms. The intrinsic viscosity, measured in tetralin at 140° C., is preferably between 0.4 and 3, and the molecular weight is preferably greater than 10,000. The melting point maximum is preferably between 120° and 135° C.

The nickel-containing catalyst preferably exists as a complex in which at least one preferably bidentate ligand contains phosphorus and oxygen.

Preferred nickel-containing catalysts are the following types:

1.) The nickel compounds known from EP-A 137,389, which can be prepared by reaction of a nickel(O) compound, or a nickel compound which can be converted into a nickel(O) compound in situ, with an adduct or a mixture of a quinoid compound and a tertiary phosphine and with a compound of the formula (I)

in which $R^1$, $R^2$ and $R^3$, independently of one another, denote optionally halogen-, hydroxyl-, $C_1$–$C_{20}$-alkoxy-, nitro- or $C_6$–$C_{12}$-aryloxy-substituted $C_1$–$C_{20}$-alkyl, $C_2$–$C_{20}$-alkenyl, $C_6$–$C_{12}$-aryl or $C_3$–$C_8$-cycloalkyl, and furthermore denote $C_6$–$C_{12}$-aryl-$C_1$–$C_{20}$-alkyl, $C_1$–$C_{20}$-alkyl-$C_6$–$C_{12}$-aryl, $C_6$–$C_{12}$-aryl-$C_2$–$C_{20}$-alkenyl, $C_1$–$C_{20}$-alkyl-$C_3$–$C_8$-cycloalkyl and $C_6$–$C_{12}$-aryl-$C_3$–$C_8$-cycloalkyl, di-$C_1$–$C_4$-alkylamino, optionally substituted phenoxy, or alkoxy, X denotes 0, $NR^4$ or

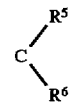

$R^4$, $R^5$ and $R^6$, independently of one another, denote hydrogen, acyl, silyl, halogen, cyano, nitro-phenyl or $R^1$, and n denotes zero or 1.

Suitable tertiary phosphines correspond to the formula (II)

in which $R^7$, $R^8$ and $R^9$, independently of one another, denote optionally halogen-, hydroxyl-, $C_1$–$C_{20}$-alkoxy- or $C_6$–$C_{12}$-aryloxy-substituted $C_1$–$C_{20}$-alkyl, $C_6$–$C_{12}$-aryl, $C_2$–$C_{30}$-alkenyl or $C_3$–$C_8$-cycloalkyl, and furthermore denote $C_6$–$C_{12}$-aryl-$C_1$–$C_{20}$-alkyl, $C_1$–$C_{20}$-alkyl-$C_6$–$C_{12}$-aryl, halogen, hydroxyl, $C_1$–$C_{20}$-alkoxy or $C_6$–$C_{12}$-aryloxy.

Suitable quinoid compounds are o- or p-quinoid compounds of the benzene and naphthalene series, and also anthraquinones, which may be further substituted.

Examples which may be mentioned are p-benzoquin-one, chloranil, 1,4-naphthoquinone and 9,10-anthraquinone.

Preferred radicals $R^1$, $R^2$ and $R^3$ are $C_1$–$C_6$-alkyl, cyclohexyl, phenyl, tolyl, benzyl, di-$C_1$–$C_4$-alkyl-amino, phenoxy and methoxy.

Preferred radicals $R^4$, $R^5$ and $R^6$ are hydrogen, $C_1$–$C_6$-alkyl, phenyl, $C_1$–$C_4$-alkylphenyl, acetyl, benzoyl, chlorophenyl, nitrophenyl, trimethylsilyl, chlorine and cyano.

$R^7$, $R^8$ and $R^9$ are preferably cyclohexyl, phenyl, tolyl, benzyl, vinyl and $C_1$–$C_4$-alkyl.

2.) The nickel compounds which are known from EP-A 101,927 and which can be prepared by reaction of a nickel (O) compound or a compound which can be converted into a nickel(O) compound in situ with compounds of the formulae (I) and (III)

in which $R^{10}$–$R^{14}$ independently of one another, optionally halogen-, hydroxyl-, $C_1$–$C_{20}$-alkoxy- or $C_6$–$C_{12}$-aryloxy-substituted $C_1$–$C_{20}$-alkyl, $C_6$–$C_{12}$-aryl, $C_2$–$C_{30}$-alkenyl or $C_3$–$C_8$-cycloalkyl, furthermore $C_6$–$C_{12}$-aryl-$C_1$–$C_{20}$-alkyl, $C_1$–$C_{20}$-alkyl-$C_6$–$C_{12}$-aryl, halogen, hydroxyl, $C_1$–$C_{20}$-alkoxy or $C_6$–$C_{12}$-aryloxy, in addition $R^{13}$ hydrogen, $R^{14}$ hydrogen, acyl or sulphonate, and $R^{10}$ is preferably $C_6$–$C_{12}$-aryl.

$R^{11}$–$R^{14}$ are preferably cyclohexyl, phenyl, tolyl, benzyl, vinyl and $C_1$–$C_4$-alkyl.

$R^{13}$ is preferably hydrogen or $C_1$–$C_4$alkoxy, $R^{14}$ is preferably hydrogen, sulphonate, acetyl or benzoyl.

3.) Nickel compounds which can be prepared by reaction of a nickel(O) compound, or a nickel compound which can be converted into a nickel(O) compound in situ, with an adduct or a mixture of maleic acid anhydride (MAA) and a tertiary phosphine, if appropriate with a compound of the formula (I) and if appropriate with an organoaluminium compound.

Suitable tertiary phosphines correspond to the formula (I) where n=zero.

Suitable organoaluminium compounds are, for example, trialkylaluminium and trialkoxyaluminium compounds in which the alkyl and alkoxy groups preferably have 1 to 4 C atoms.

1 to 4 moles of each of MAA and the tertiary phosphine and 0 to 4 moles of the compound of the formula (I), are preferably employed per mole of nickel(O) compound, particularly preferably 1 mole of MAA and tertiary phosphine and 1 mole of the compound of the formula (I) per mole of the nickel(O) compound.

The reaction temperature is 0° to 100° C., particularly 20° to 70° C.

The following apply concurrently for the nickel-containing catalysts mentioned under 1.) to 3.):

Examples of nickel(O) compounds which may be mentioned are Ni(cyclooctadiene)$_2$ and Ni(allyl)$_2$.

Examples of nickel compounds which can be converted into nickel(O) compounds in situ which may be mentioned are the following: Ni acetylacetonate, Ni octanoate and Ni stearate, which can be reduced with the aid of conventional reducing agents, such as boranate, alanate, aluminium alkyls or organolithium compounds.

The reaction is carried out with exclusion of oxygen, preferably in a solvent, such as benzene, toluene, cyclohexane and n-hexane, which must be inert towards the reactants.

When the reaction is complete, the catalyst can be employed directly, without isolation, for the oligomerization of ethylene. The reaction mixture may also be filtered, it being possible for the flitrate, which contains the catalyst, to be employed for the oligomerization. The catalyst may also be isolated by concentrating the reaction mixture or by concentrating and/or cooling the flitrate.

Further suitable nickel-containing catalysts for the oligomerization are known from the Dutch Patent Applications 7,016,037, 7,016,039, 6,813,667 and 7,015,984, German Offenlegungsschriften (German Published Specifications) 2,062,239, 2,053,758, 1,931,060 and 2,264,088, U.S. Pat. Nos. 3,424,816, 3,825,615, 3,737,475 and 3,354,236, Belgian Patent Specifications 760,387, 758,106 and 744,304, and Canadian Patent Specification 770,655.

The amount of the nickel compound used is not important. Typical catalyst concentrations are between $10^{-2}$ to $10^{-4}$ mol per liter. The amount of catalyst, relative to ethylene, is in the range from 0.005 to 10% by weight, preferably 0.01 to 0.1% by weight.

The following procedures are suitable for the oligomerization using the Ni-containing catalysts:

a) Addition of the ethylene to the solid, dissolved or suspended catalyst (or its components) at the desired temperature b) injection of the catalyst solution or suspension (or its components) into the ethylene c) continuous metering of the catalyst solution or suspension (or its components) into the ethylene under prespecified desired polymerization conditions (pressure and temperature).

The oligomerization may be carried out in a solvent or diluent or suspending agent, aliphatics, such as n-hexane and cyclohexane, aromatics, such as benzene, toluene, xylene and chlorobenzene, ketones, such as acetone and methyl ethyl ketone, esters, such as ethyl acetate, acid amides, such as dimethylformamide, and ethers, such as tetrahydrofuran, or mixtures of these solvents, being suitable, for example.

The oligomerization may be carried out both continuously and also batchwise.

The oligomerization temperature is preferably 20° to 200° C. particularly 60° to 150° C. The ethylene pressure to be used is at least 1 bar, and 5 to 1,000 bar are preferred.

Cr-containing catalysts, preferably chromium(II) and chromium(III) compounds, which are located on a high-surface area support are used for the polymerization.

The chromium compounds are preferably coordinatively unsaturated. Silicon and aluminium oxides, and mixtures thereof, are preferably used as support. However, other conventional supports may be employed. Particularly preferred supports are silica gels and aluminium oxide gels, preferably having a surface area of 300 to 600 m²/g.

The Cr-containing catalyts are preferably prepared, in the fashion known from DE-A-3,427,319, by application of a chromium(VI) compound to a support, with subsequent activation, reduction and conventional further treatment.

In particular, the catalyst is produced by treating the support material (a water-resistant, oxidic inert substance such as oxides of silicon or aluminum, or mixtures thereof, having a surface area of 300–600 m²/g) with an aqueous solution of a chromium(VI) compound, such as for example a chromate solution of such a concentration that the finished catalyst has a chromium content of 0.1 to 3.5, preferably 0.5 to 2% by weight.

After the solution has been removed, the impregnated support is dried and then heated to temperatures of higher than 500° C., preferably from 600° to 800° C., in an oxygen stream for ½ to 3, and preferably for 1 to 2 hours.

The chromium(VI) applied in this manner to the support is then reduced with a gaseous reducing agent, such as for example hydrogen, a lower alkane or CO, preferably with carbon monoxide, at 250° to 500° C., and preferably 300° to 400° C. to form coordinatively unsaturated chromium(II). The catalyst thus obtained is sensitive to oxygen and moisture and has to be stored under an oxygen-free, dry, inert gas, such as for example argon or nitrogen. As described in the dissertation by D. Naumann, 1979, "Freie Universität Berlin", catalysts containing coordinatively unsaturated chromium(III) can be obtained from the above-mentioned product, for example, by suspending the product in oxygen-free water and subsequently introducing gaseous oxygen into the resulting suspension until the oxidation state III is obtained completely or to the required degree.

After filtration and drying, catalysts which contain only chromium(III) can be stored with the exclusion of moisture, without any additional precautionary measures. Before use, they should be heated preferably to 600° to 800° C. for a period of 1 to 3 hours, in an inert gas stream, for example in an argon stream or in vacuo.

The invention furthermore relates to preformed bifunctional catalysts which can be obtained by contacting a nickel-containing oligomerization catalyst to a chromium-containing polymerization catalyst in a preferably inert e.g. hydrocarbon reaction medium, if appropriate at elevated temperature.

Preferred nickel-containing catalysts are the catalysts mentioned above under 1. to 3.

Preferred chromium-containing catalysts are the chromium(II) and chromium(III) compounds mentioned above, particularly in the form of supported catalysts.

The preformed bifunctional catalyst can be isolated before use and, if appropriate, stored as a solid.

The process according to the invention surprisingly allows branched low-pressure polyethylenes to be obtained starting from a single starting material (ethylene). The new polyethylenes, according to the invention, having simultaneously side chains of different lengths, exhibit surprising valuable properties, particularly good mechanical properties.

They can be used for the production of moulded articles and films.

EXAMPLE 1

A 12-liter autoclave was heated for 3 hours at 120° C. in a vacuum, filled with nitrogen as protective gas and cooled, and 7 liters of cyclohexane were pumped in and 1 liter was distilled of.f. 3.9 g (5.56 mmol) of $NiPh(Ph_2PCHCPhO)(PPh_3)$ in 200 ml of toluene were pumped in over 1 hour at an internal temperature of 950° C. and an ethylene pressure of 15 bar. The amount of ethylene taken up was about 1.5 kg. The autoclave was cooled and the pressure released. After removal of the solvent in vacuo, the α-olefine, liquefied by heat, was precipitated in cold pentane, filtered off under suction and dried in vacuo.

For the copolymerization, a 12-liter autoclave was heated in a vacuum and filled with argon as protective gas, 5 liters of n-hexane were pumped in and 1 liter was distilled off, and the autoclave was cooled under argon. 625 g of α-olefine (see above) and 60.3 g of chromium catalyst (silica gel support: Merck 7733, 800°/350° C., $Cr^{II}$ 0.91%, oxidation state 2.17) were then transferred in. The autoclave was heated to 140° to 150° C. under a cold pressure of ethylene of 8 bar, and the pressure was maintained at 18 bar during the reaction. After about 2.5 hours, the autoclave was cooled, the pressure was released and the solid product was isolated and dried in vacuo. 1.3 kg of polymer had formed.

EXAMPLE 2

A 40-liter autoclave was heated in a vacuum, filled with nitrogen protective gas, and 18 liters of cyclohexane were pumped in, of which 2 liters were distilled off. 1.06 g (2 mmol) of $NiPh(Ph_2PCHCPhO)(Me_3PCH_2)$ in 200 ml of toluene were pumped in at 85° C. and 10 to 12 bar of ethylene. When the reaction was complete, the autoclave was cooled, the pressure was released, and the solid α-olefine was isolated by filtration and dried in vacuo.

Yield: 2,3444 g

Melting point (DSC): 122° C.

intrinsic viscosity intetralinat 140° C.: 0.12 dl/g

For the copolymerization, a 6-liter autoclave was heated in a vacuum and filled with argon as protective gas, 700 g of the α-olefine were transferred in, and the autoclave was heated to 120° C. and evacuated, a pressure of 4 bar of argon introduced, and the autoclave was cooled and charged in an argon counterstream with 0.5 liter of n-hexane and 6.55 g of chromium catalyst (silica gel support: Grace 952, 800°/350° C., $Cr^{II}$ 1.20%, oxidation state 2.18). The polymerization was effected at 150° C./20 bar of ethylene. After 5 hours, the autoclave was cooled and the pressure released, and 917 g of solid polymer were obtained after isolation and drying.

Melting point (DSC): 125° C.

intrinsic viscosity intetraiininat 140° C.: 0.65 dl/g

EXAMPLE 3

7 liters of cyclohexane were pumped into an autoclave, heated in a vacuum and filled with argon protective gas, and 1 liter was subsequently distilled off. After cooling under protective gas, 1.45 g (2.3 mmol) of $NiPh(Ph_2PCHCMeO)(Pr^i_3PCHPh)$ were transferred in in a counterstream of argon. The internal temperature was increased to 100° C. under a cold pressure of ethylene of 5 bar. The reaction was then allowed to proceed for 1 hour at 100° C./18 bar. After cooling and releasing the pressure in the autoclave, 5.8 g of chromium catalyst were transferred in in a counterstream of argon. (Silica gel support: Grace 952, 800°/350° C. $Cr^{II}$ 0.84%, oxidation state 2.48).

The polymerization was subsequently effected at 100° C./18 bar of ethylene. Work-up as described in Example 1 yielded 408 g of solid polymer. Melting point (DSC) 128° C.

Intrinsic Viscosity in tetralin at 140° C.: 190 dl/g.

EXAMPLE 4

7 liters of n-hexane were pumped into an appropriately prepared autoclave, 1 liter was distilled off, and, after cooling. 6.82 g of chromium catalyst (silica gel support: Grace 952, 800°/350° C., $Cr^{II}$ 1.20%, oxidation state 2.18) and 1.55 g (2.21 mmol) of $NiPh(Ph_2PCHCPhO)(Ph_3P)$ were transferred in in a counterstream of argon, and reacted with 10 mol of ethylene at 100° C. When the reaction was complete and the work-up had been effected according to Example 1, 210 g of solid polymer were weighed out.

Melting point (DSC) 128° C.

Intrinsic viscosity in tetralin at 140° C. 1.21 dl/g.

EXAMPLE 5

60 ml of cyclohexane were placed in a 100 ml autoclave. A solution of 17.5 mg of Ni ylid catalyst NiPh ($Ph_2PCHCPhO)(Me_3PCH_2$) in 5 ml of toluene was then added to the reactor at 20° C. 264 mg of the Cr-silica gel catalyst (800–350), $Cr^{II}$ 0.87, oxidation state=2.31 were subsequently added, and the reaction mixture was stirred at room temperature for 15 minutes.

The temperature was then increased to 85° C. over 10 minutes, and the polymerization was initiated at 85°–90° C. by addition of ethylene (ethylene pressure~9.6 bar). The temperature increased to about 100° C. and remained constant for I hour. After a reaction time of 60 minutes, the autoclave was cooled, the pressure was released and the polymer (4.5 g) was isolated.

HPLC measurements showed that a single polymer having monomodal distribution had been produced. No free α-olefines could be found in the polymer. Result of the DSC analysis: melting point=132° C.

Compared to a HDPE, prepared under identical conditions but using the Cr catalyst, having a melting point=137° C. the product has a lower molecular weight and a lower melting point.

We claim:

1. A process for polymerizing ethylene to form branched low-pressure polyethylene having a main chain and side chains of different lengths, the side chains having lengths of 14–200 carbon atoms, which comprises reacting ethylene in the presence of a catalyst at a pressure of 1–1000 bar and at a temperature of 20–200 degrees C, the catalyst comprising a preformed bifunctional catalyst obtained by bonding in an inert reaction medium:

i. a first catalyst comprising a chromium compound on a silica or aluminum oxide support, wherein the quantity of chromium compound, based on the quantity of the support, is from 0.1 to 3.5% by weight, the chromium compound being in the form of a coordinatively unsaturated chromium (II) and/or chromium (III) compound which is obtained by treating the support with an aqueous solution of a chromium (VI) compound, separating the solution from the impregnated support, drying the impregnated support and heating it at temperatures above 500° C. in an oxygen stream for ½ to 3 hours and subsequently reducing the chromium (VI) compound with a gaseous reducing agent at 250° to 500° C. to yield a coordinatively unsaturated chromium (II) compound; with ii) a second catalyst comprising a nickel compound selected from the group consisting of:
   a) a nickel compound produced by reaction of a nickel (O) compound, or a nickel compound which can be converted into a nickel (O) compound in situ, with an adduct or a mixture of a quinoid compound and a tertiary phosphine and with a compound of the formula (I)

in which $R^1$, $R^2$ and $R^3$, independently of one another, denote optionally halogen-, hydroxyl-, $C_1$–$C_{20}$-alkoxy-, nitro- or $C_6$–$C_{12}$-aryloxy-substituted $C_1$–$C_{20}$-alkyl, $C_2$–$C_{20}$-alkenyl, $C_6$–$C_{12}$-aryl or $C_3$–$C_8$-cycloalkyl, or denote $C_6$–$C_{12}$-aryl-$C_1$–$C_{20}$-alkyl, $C_1$–$C_{20}$-alkyl-$C_6$–$C_{12}$-aryl, $C_6$–$C_{12}$-aryl-$C_2$–$C_{20}$-alkenyl, $C_1$–$C_{20}$-alkyl-$C_3$–$C_8$-cycloalkyl and $C_6$–$C_{12}$-aryl-$C_3$–$C_8$-cycloalkyl, di-$C_1$–$C_4$-alkylamino, phenoxy, or alkoxy, X denotes O, $NR^4$ or

$R^4$, $R^5$ and $R^6$, independently of one another, denote hydrogen, acyl, silyl, halogen, cyano, nitrophenyl or $R^1$ and n denotes zero or 1;

and b) a nickel compound obtained by reacting a nickel (O) compound or a compound which can be converted into a nickel (O) compound in situ with compounds of the formulae (I) as defined above and (III)

in which $R^{10}$–$R^{14}$ represent, independently of one another, optionally halogen-, hydroxyl, $C_1$–$C_{20}$-alkoxy-, or $C_6$–$C_{12}$-aryloxy-substituted $C_1$–$C_{20}$-alkyl, $C_6$–$C_{12}$-aryl, $C_2$–$C_{30}$-alkenyl or $C_3$–$C_8$-cycloalkyl, $C_6$–$C_{12}$-aryl-$C_1$–$C_{20}$-alkyl, $C_1$–$C_{20}$-alkyl-$C_6$–$C_{12}$-aryl, halogen, hydroxyl, $C_1$–$C_{20}$-alkoxy, or $C_6$–$C_{12}$-aryloxy, in addition to which $R^{13}$ may be hydrogen, and $R^{14}$ may be hydrogen, acyl or sulphonate.

* * * * *